US 12,366,077 B2

(12) United States Patent
Yueda

(10) Patent No.: US 12,366,077 B2
(45) Date of Patent: Jul. 22, 2025

(54) CONCRETE VIBRATOR

(71) Applicant: MAKITA CORPORATION, Anjo (JP)

(72) Inventor: Ryuki Yueda, Anjo (JP)

(73) Assignee: MAKITA CORPORATION, Anjo (JP)

(*) Notice: Subject to any disclaimer, the term of this patent is extended or adjusted under 35 U.S.C. 154(b) by 735 days.

(21) Appl. No.: 17/676,906

(22) Filed: Feb. 22, 2022

(65) Prior Publication Data
US 2022/0290451 A1  Sep. 15, 2022

(30) Foreign Application Priority Data

Mar. 12, 2021 (JP) ................................. 2021-040617

(51) Int. Cl.
| | |
|---|---|
| *E04G 21/08* | (2006.01) |
| *B01F 31/44* | (2022.01) |
| *B01F 35/32* | (2022.01) |
| *H02K 7/06* | (2006.01) |
| *B01F 101/28* | (2022.01) |

(52) U.S. Cl.
CPC .............. *E04G 21/08* (2013.01); *B01F 31/44* (2022.01); *B01F 35/3204* (2022.01); *H02K 7/063* (2013.01); *B01F 2101/28* (2022.01)

(58) Field of Classification Search
CPC .................................................... E04G 21/08
USPC ................................................ 366/123, 128
See application file for complete search history.

(56) References Cited

U.S. PATENT DOCUMENTS

| | | | | | |
|---|---|---|---|---|---|
| 1,356,731 | A | * | 10/1920 | Muchow ................. | A61C 5/68 |
| | | | | | 366/128 |
| 2,059,239 | A | * | 11/1936 | Jackson ................. | E04G 21/08 |
| | | | | | 310/67 R |
| 2,073,393 | A | * | 3/1937 | Mall ....................... | E04G 21/08 |
| | | | | | 404/115 |
| 3,188,054 | A | * | 6/1965 | Mason .................... | B06B 1/16 |
| | | | | | 366/121 |
| 3,202,402 | A | * | 8/1965 | Giertz-Hedstrom .... | E04G 21/08 |
| | | | | | 366/128 |
| 5,725,304 | A | * | 3/1998 | Inai ......................... | H02K 9/26 |
| | | | | | 366/120 |
| 2022/0021065 | A1 | * | 1/2022 | Yueda .................... | H01M 50/267 |

FOREIGN PATENT DOCUMENTS

| | | |
|---|---|---|
| JP | S57-127569 U | 8/1982 |
| JP | 2019-217569 A | 12/2019 |

OTHER PUBLICATIONS

Aug. 6, 2024 Office Action issued in Japanese Patent Application No. 2021-040617.

* cited by examiner

*Primary Examiner* — David L Sorkin
(74) *Attorney, Agent, or Firm* — Oliff PLC

(57) ABSTRACT

A concrete vibrator can further reduce vibration. The concrete vibrator includes a motor, a flexible shaft drivable by the motor, an unbalanced weight drivable with the flexible shaft, a flexible hose at least partially covering the unbalanced weight and the flexible shaft, a body housing accommodating the motor, and an elastic member between the body housing and the flexible hose.

15 Claims, 8 Drawing Sheets

CONCRETE VIBRATOR

CROSS-REFERENCE TO RELATED APPLICATIONS

This application claims the benefit of priority to Japanese Patent Application No. 2021-040617, filed on Mar. 12, 2021, the entire contents of which are hereby incorporated by reference.

BACKGROUND

1. Technical Field

The present disclosure relates to a concrete vibrator such as a rechargeable concrete vibrator.

2. Description of the Background

A concrete vibrator including a direct connection from a motor to a distal end of a flexible shaft is described in Japanese Unexamined Patent Application Publication No. 2019-217569.

BRIEF SUMMARY

A concrete vibrator that can reduce vibration is awaited.

A concrete vibrator that can reduce a current value in the motor is also awaited.

A first aspect of the present disclosure provides a concrete vibrator, including:
a motor;
a shaft drivable by the motor;
an imbalance member drivable with the shaft;
a hose at least partially covering the imbalance member and the shaft;
a housing accommodating the motor; and
an elastic member between the housing and the hose.

A second aspect of the present disclosure provides a concrete vibrator, including:
a motor;
a housing accommodating the motor;
a coupling connected to the motor;
a shaft drivable with the coupling;
an imbalance member drivable with the shaft; and
a hose at least partially covering the imbalance member and the shaft, the hose being movable relative to the housing.

The concrete vibrator according to the above aspects of the present disclosure can further reduce vibration.

The concrete vibrator according to the above aspects of the present disclosure can further reduce a current value in the motor.

DETAILED DESCRIPTION

Embodiments and their modifications will now be described with reference to the drawings as appropriate.

A concrete vibrator will now be described in the embodiments as an example of an electric work machine, or an example of an electric tool.

The directional terms such as front, rear, up, down, right, and left in the embodiments and the modifications are defined for ease of explanation, and may be changed depending on, for example, at least the operating situations or the status of a movable member.

The present disclosure is not limited to the embodiments and the modifications.

Figure 1:
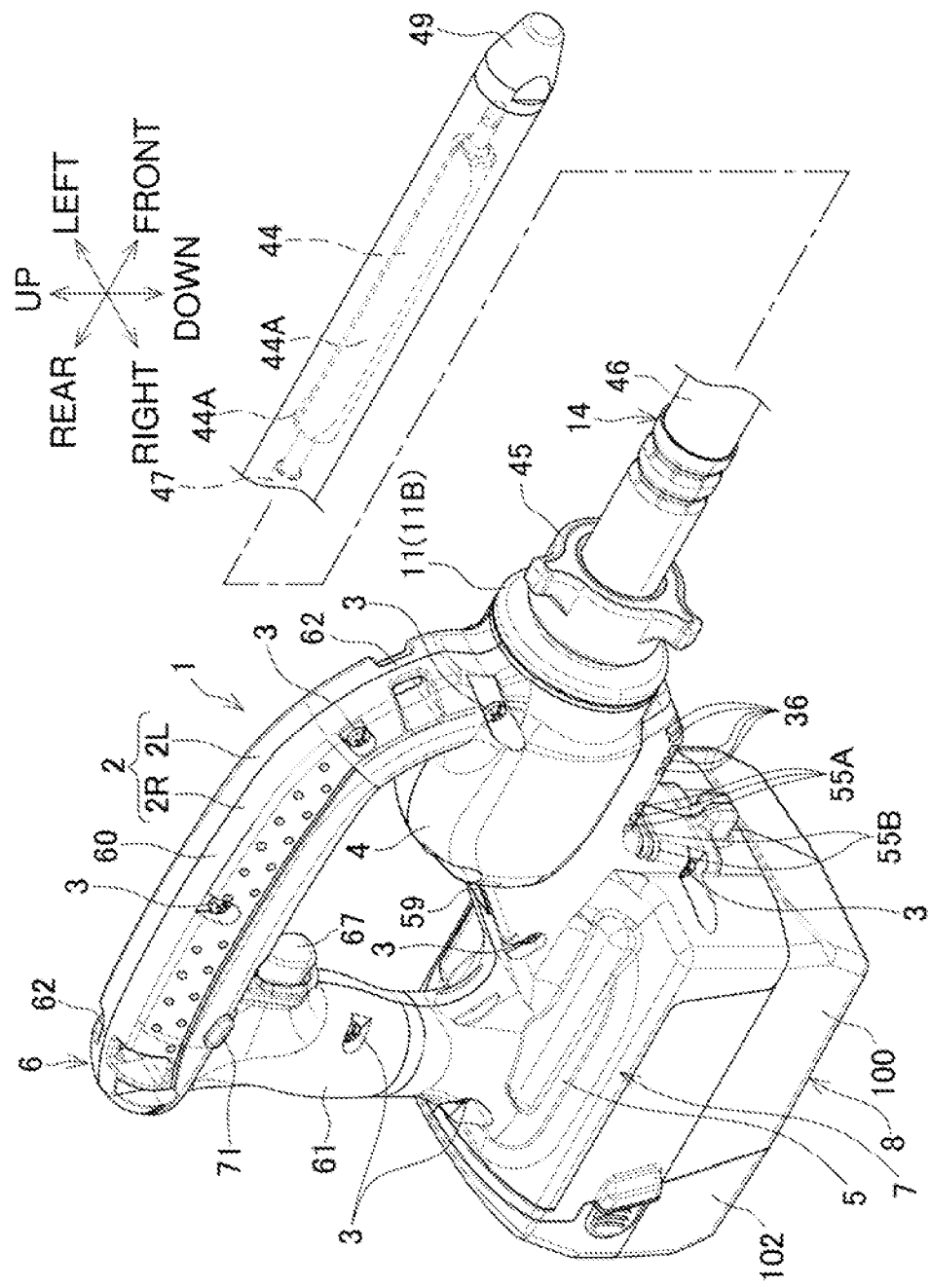
FIG. 1 is a perspective view of a rechargeable concrete vibrator.
Figure 2:
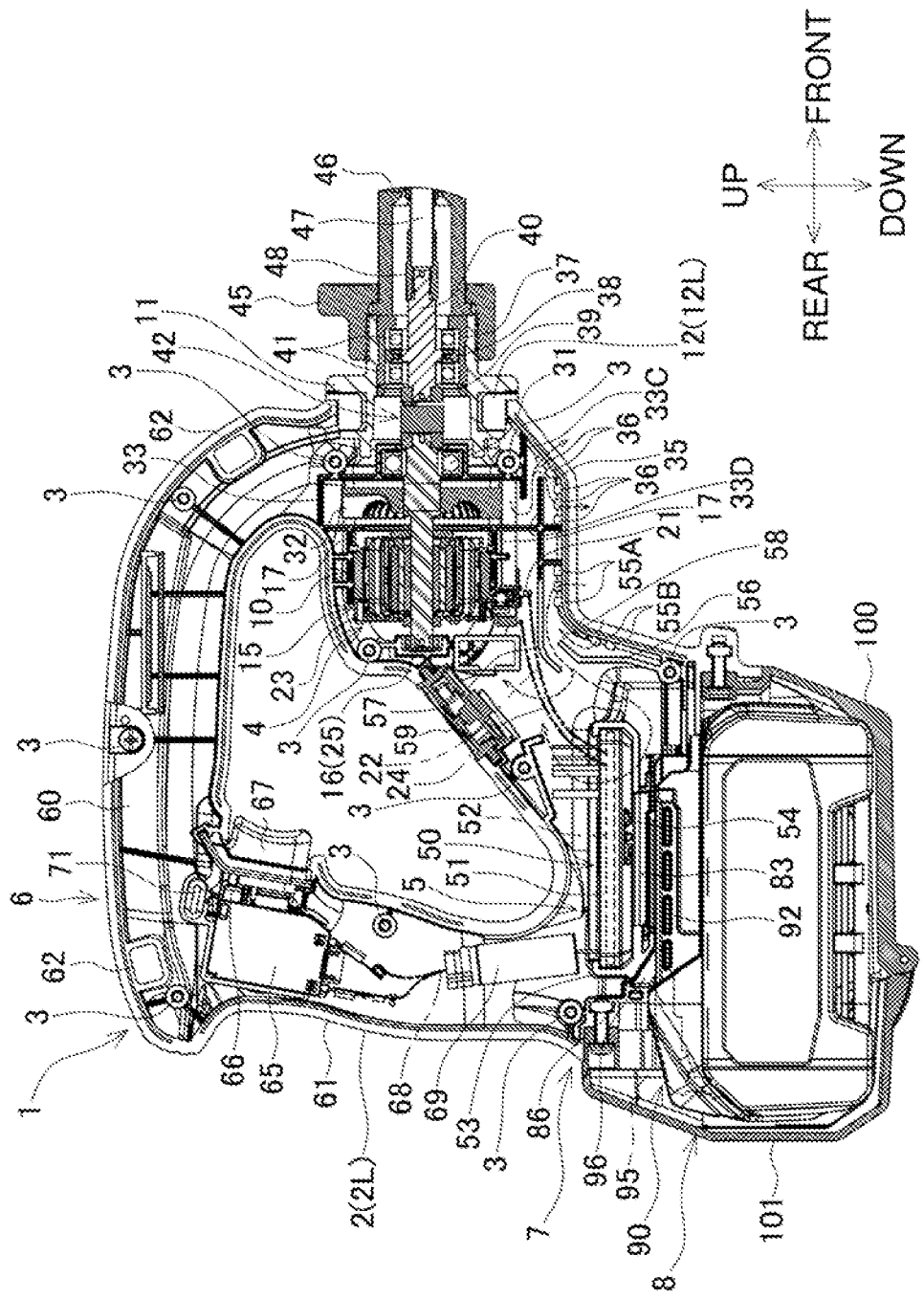
FIG. 2 is a longitudinal central sectional view of the rechargeable concrete vibrator.
Figure 3:
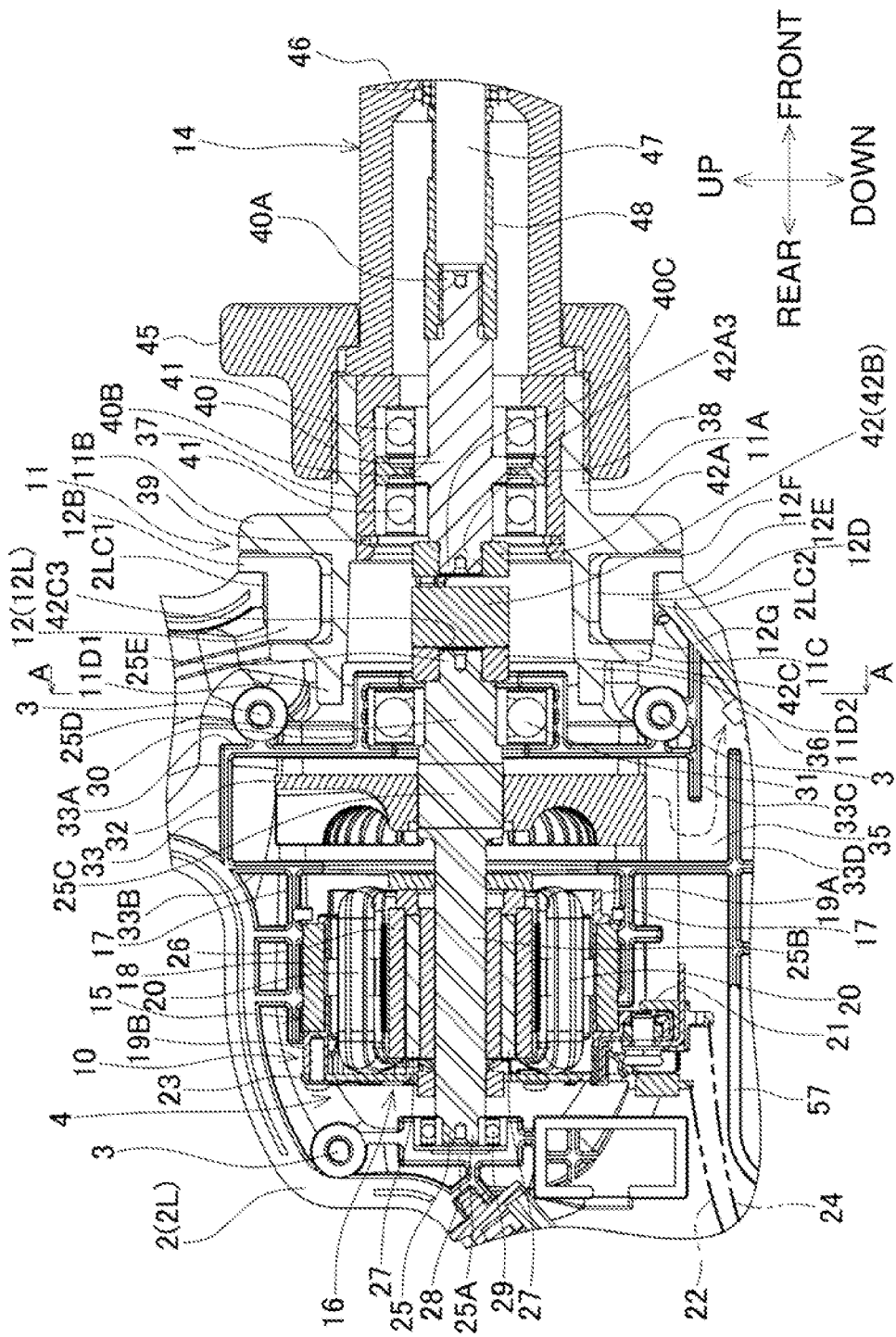
FIG. 3 is a partially enlarged view of FIG. 2.
Figure 4:
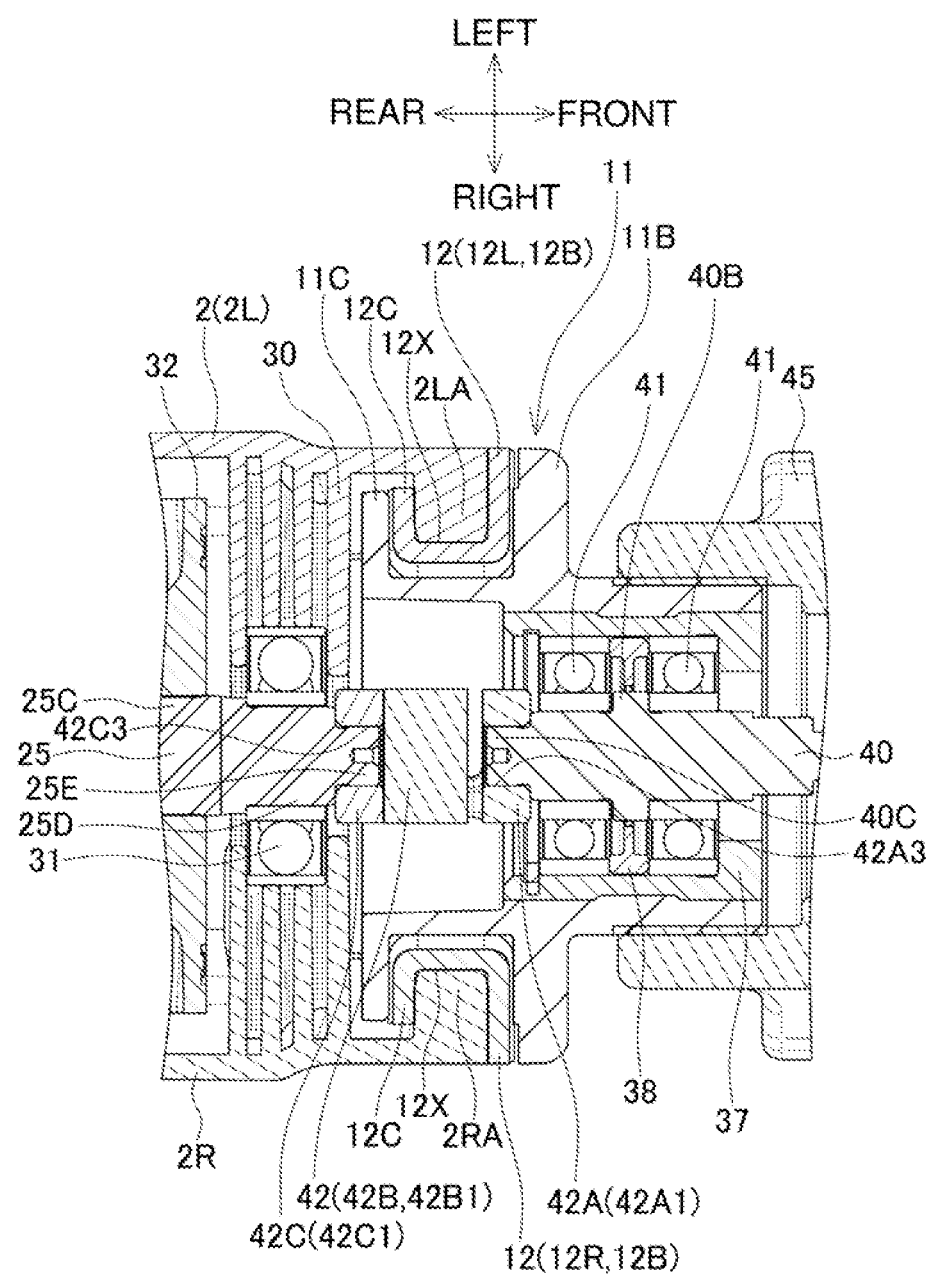
FIG. 4 is a partial lateral central sectional view of the rechargeable concrete vibrator.
Figure 5:
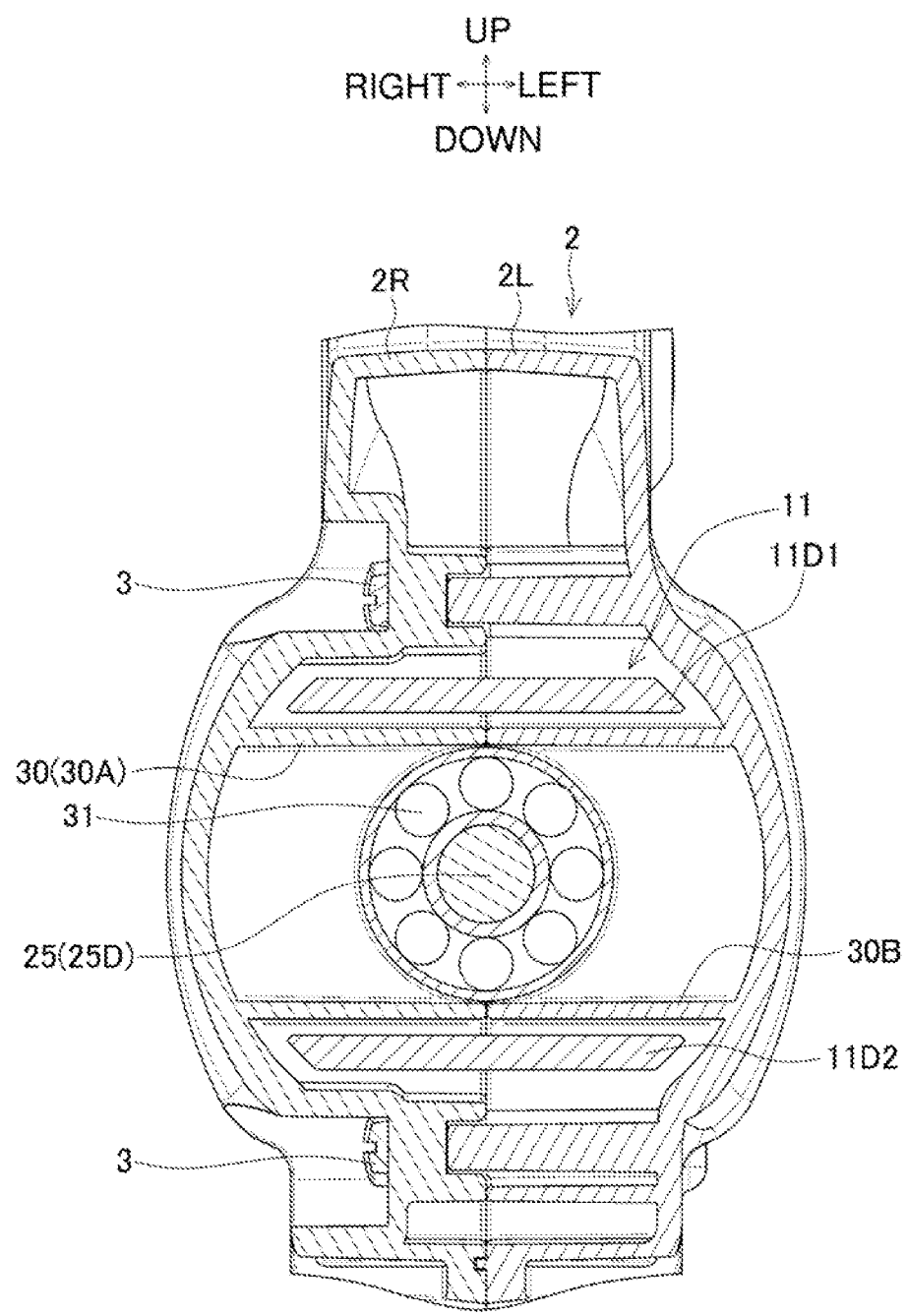
FIG. 5 is a partial cross-sectional view taken along line A-A in FIG. 3.

FIG. 1 is a perspective view of a rechargeable concrete vibrator (hereafter, a concrete vibrator). FIG. 2 is a longitudinal central sectional view of the concrete vibrator. FIG. 3 is a partially enlarged view of FIG. 2. FIG. 4 is a partial lateral central sectional view of the concrete vibrator. FIG. 5 is a partial cross-sectional view taken along line A-A in FIG. 3.

A concrete vibrator 1 includes a body housing 2 as a housing. The body housing 2 includes a left resin housing half 2L and a right resin housing half 2R fastened with multiple screws 3 from the right. The body housing 2 includes a motor compartment 4, a controller compartment 5, a grip 6, and a battery holder 7. The battery holder 7 receives a battery cover 8 in a detachable manner.

The motor compartment 4 is a cylinder extending in the front-rear direction. The motor compartment 4 accommodates a motor 10.

At least the motor compartment 4, the controller compartment 5, the grip 6, or the battery holder 7 may be separate from the housing.

The motor compartment 4 receives a holder 11 attached to its front end. The holder 11 is held by the motor compartment 4 with an elastic member 12 as an elastic member between them. The holder 11 holds the elastic member 12. The holder 11 is formed from a metal, or more specifically, aluminum. Various metals including their alloys may be used. The elastic member 12 may be in contact with the holder 11 on its outer surfaces (radially inward inside surface, front surface, and rear surface) excluding its radially outward outer side surface. This structure allows the elastic member 12 to be held more firmly, reducing vibration further.

Figure 6:
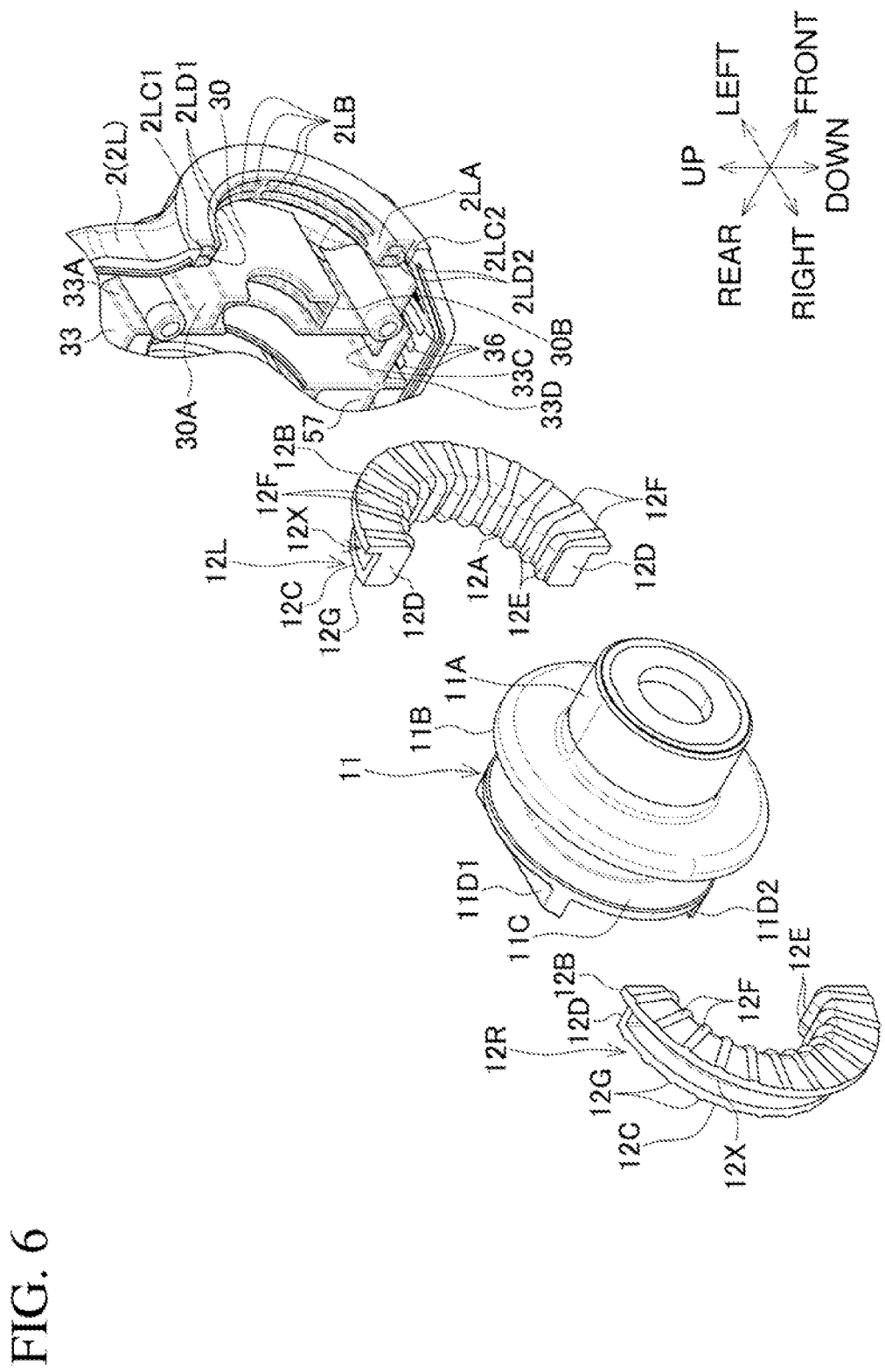
FIG. 6 is an exploded perspective view of a front portion of a motor compartment, a front cover, and a rubber ring in the rechargeable concrete vibrator viewed from the front.
Figure 7:
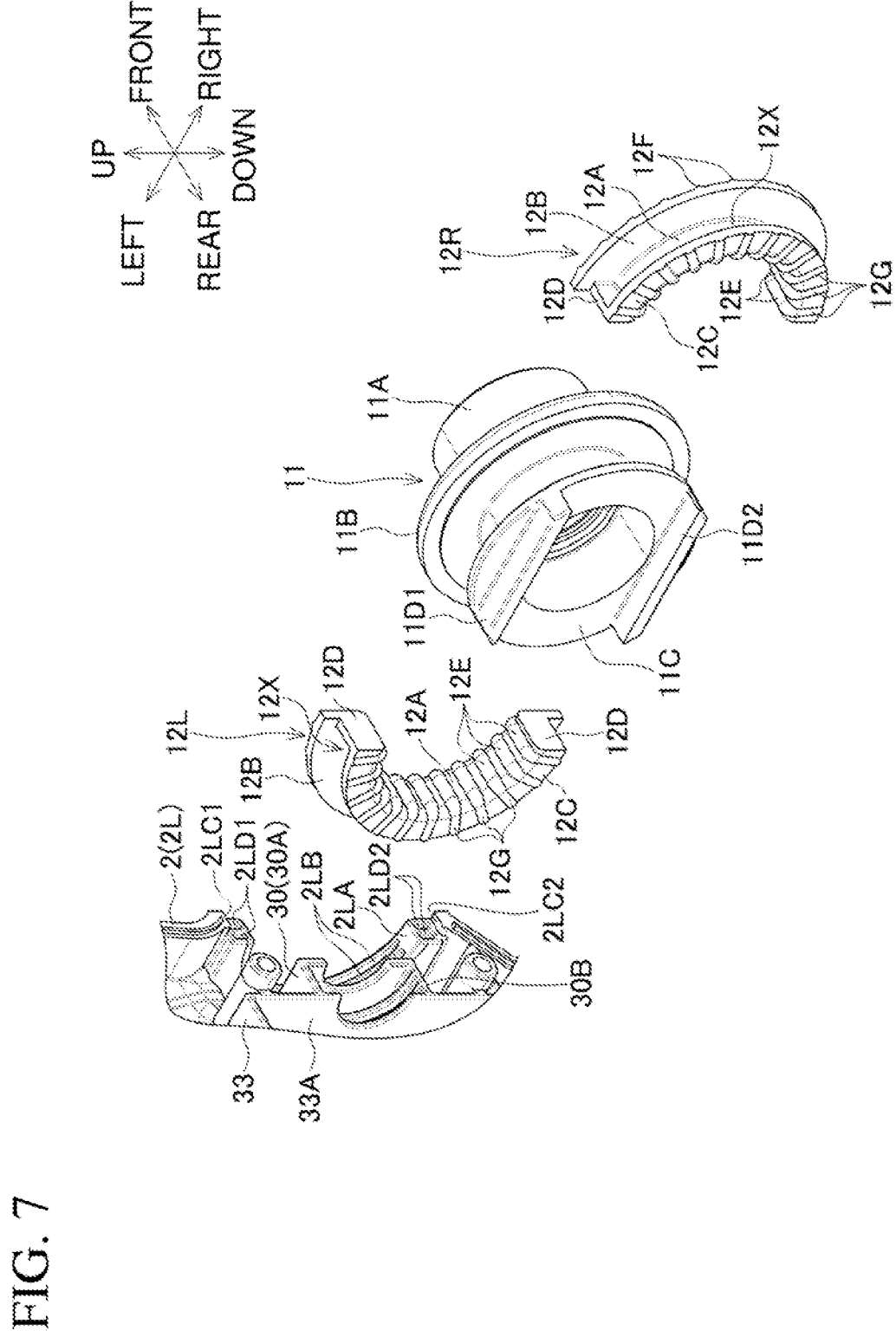
FIG. 7 is an exploded perspective view of the front portion of the motor compartment, a holder, and the rubber ring viewed from the rear.

FIG. 6 is an exploded perspective view of a front portion of the motor compartment 4, the holder 11, and the elastic member 12 viewed from the front. FIG. 7 is an exploded perspective view of the front portion of the motor compartment 4, the holder 11, and the elastic member 12 viewed from the rear.

The holder 11 includes a cylinder 11A, a front flange 11B, a rear flange 11C, an upper rear piece 11D1, and a lower rear piece 11D2. The front flange 11B and the rear flange 11C protrude radially outward from the cylinder 11A. The upper rear piece 11D1 protrudes rearward from an upper rear surface of the rear flange 11C. The lower rear piece 11D2 protrudes rearward from a lower rear surface of the rear flange 11C.

The elastic member 12 includes a left half elastic member 12L and a right half elastic member 12R. The elastic member 12 is located between the front flange 11B and the rear flange 11C on the holder 11. This structure facilitates attachment of the elastic member 12.

The left half elastic member 12L includes a half elastic member body 12A, a front flange 12B, a rear flange 12C, and end walls 12D. The front flange 12B and the rear flange 12C protrude radially outward from the half elastic member body 12A. The end walls 12D each connect the upper end of the front flange 12B and the lower end of the rear flange 12C.

A groove 12X is located between the front flange 12B and the rear flange 12C. The groove 12X extends circumferentially and is recessed radially inward. The half elastic member body 12A includes multiple protrusions 12E on its inner surface. Each protrusion 12E protrudes radially inward from its adjacent portions. Each protrusion 12E extends in the front-rear direction. The protrusions 12E are arranged at circumferentially equal intervals.

The front flange 12B includes multiple front ridges 12F on its front surface. Each front ridge 12F extends radially. Each front ridge 12F protrudes frontward from its adjacent portions. The front ridges 12F are at circumferential positions corresponding to the positions of the protrusions 12E. Each front ridge 12F is in contact with the rear surface of the front flange 11B on the holder 11.

The rear flange 12C includes multiple rear ridges 12G on its rear surface. Each rear ridge 12G extends radially. Each rear ridge 12G protrudes rearward from its adjacent portions. The rear ridges 12G are at circumferential positions corresponding to the positions of the protrusions 12E. Each rear ridge 12G is in contact with the front surface of the rear flange 11C on the holder 11.

The right half elastic member 12R is bilaterally symmetrical with the left half elastic member 12L. The right half elastic member 12R includes a half elastic member body 12A, a front flange 12B, a rear flange 12C, and end walls 12D. The front flange 12B and the rear flange 12C protrude radially outward from the half elastic member body 12A. The end walls 12D each connect the upper end of the front flange 12B and the lower end of the rear flange 12C.

A groove 12X is located between the front flange 12B and the rear flange 12C. The groove 12X extends circumferentially and is recessed radially inward. The half elastic member body 12A includes multiple protrusions 12E on its inner surface. Each protrusion 12E protrudes radially inward from its adjacent portions. Each protrusion 12E extends in the front-rear direction. The protrusions 12E are arranged at circumferentially equal intervals.

The front flange 12B includes multiple front ridges 12F on its front surface. Each front ridge 12F extends radially. Each front ridge 12F protrudes frontward from its adjacent portions. The front ridges 12F are at circumferential positions corresponding to the positions of the protrusions 12E. Each front ridge 12F is in contact with the rear surface of the front flange 11B on the holder 11.

The rear flange 12C includes multiple rear ridges 12G on its rear surface. Each rear ridge 12G extends radially. Each rear ridge 12G protrudes rearward from its adjacent portions. The rear ridges 12G are at circumferential positions corresponding to the positions of the protrusions 12E. Each rear ridge 12G is in contact with the front surface of the rear flange 11C on the holder 11.

At least the protrusions 12E, the front ridges 12F, or the rear ridges 12G may be eliminated. More or fewer protrusions 12E, front ridges 12F, and rear ridges 12G may be included. For example, the elastic member 12, or each of the left half elastic member 12L and the right half elastic member 12R may include a single protrusion. The protrusions 12E, the front ridges 12F, and the rear ridges 12G may extend in directions different from the directions described above. At least the protrusions 12E, the front ridges 12F, or the rear ridges 12G may have a shape other than ridges. At least the protrusions 12E, the front ridges 12F, or the rear ridges 12G may be arranged differently from the arrangement described above. The elastic member 12 may include the right half elastic member 12R and the left half elastic member 12L integral with each other without the end walls 12D. The elastic member 12 may be divided into three or more parts.

A half-open portion 2LA in the front portion of the housing half 2L corresponds to a left half of a cylindrical opening in the front portion of the motor compartment 4. The half-open portion 2LA has multiple recesses 2LB on its curved surface. Each recess 2LB is recessed radially outward.

A dent 2LC1 is located in an upper portion of the half-open portion 2LA. The recess 2LC1 is recessed leftward from the joint surface of the housing half 2L for receiving the housing half 2R in the upper portion of the half-open portion 2LA. A dent 2LC2 is located in a lower portion of the half-open portion 2LA. The dent 2LC2 is recessed leftward from the joint surface of the housing half 2L for receiving the housing half 2R in the lower portion of the half-open portion 2LA.

The dents 2LC1 and 2LC2 each are recessed by, from the corresponding joint surface, the same depth as the thickness of the end walls 12D of the left half elastic member 12L. The dent 2LC1 has multiple recesses 2LD1. Each recess 2LD1 is recessed radially outward. The dent 2LC2 has multiple recesses 2LD2. Each recess 2LD2 is recessed radially outward.

In the same manner as for the half-open portion 2LA, the housing half 2R has a half-open portion 2RA (refer to FIG. 4) in its front portion. This structure allows the elastic member 12 to be less likely to slip relative to the body housing 2, and held more firmly, reducing vibration further. At least the recesses 2LB, 2LD1, or 2LD2 may be eliminated.

The housing half 2L has the half-open portion 2LA protruding radially inward from its immediately rear portion. The half-open portion 2LA is held between the front flange 12B and the rear flange 12C on the left half elastic member 12L. The half-open portion 2LA has its inner curved surface in contact with the protrusions 12E on the left half elastic member 12L. The half-open portion 2LA is received in the groove 12X on the left half elastic member 12L. The half-open portion 2RA in the housing half 2R similarly holds the right half elastic member 12R.

The cylinder 11A receives a vibrator 14 connected to its front end.

The motor 10 is an inner-rotor brushless motor. The motor 10 includes an outer stator 15 and a rotor 16 located inside the stator 15. The motor 10 being accommodated has a rotational shaft 25 inside the rotor 16 extending in the front-rear direction. The stator 15 is supported between upper and lower support ribs 17 raised from the inner surfaces of the left and right housing halves 2L and 2R.

The rotational shaft 25 includes a rear end 25A, a middle portion 25B, a rear larger-diameter portion 25C, a front larger-diameter portion 25D, and a front end 25E in this order from the rear.

The stator 15 includes a stator core 18 and insulators 19A and 19B located in front of and the rear of the stator core 18. The stator core 18 includes multiple (six) coils 20 wound around the stator core 18 with the insulators 19A and 19B between them. The coils 20 are in a three-phase connection on the rear insulator 19B. Three-phase power wires 22 extend from a connector 21 that is fastened to the lower end of the insulator 19B with a screw. The power wires 22 extend above a controller 50 inside the controller compartment 5 to be connected to the upper surface of a control circuit board 52.

The rear insulator 19B receives a sensor circuit board 23 including rotation detecting elements (not shown) that are fastened to its rear surface with a screw. Signal wires 24 extending from the lower end of the sensor circuit board 23 also extend above the controller 50 to be connected to the upper surface of the control circuit board 52. Each wire is indicated by a simple two-dot chain line in FIGS. 2 and 3.

The rotor 16 includes the rotational shaft 25, a rotor core 26, and multiple (four) permanent magnets 27. The rotor core 26 surrounds the rotational shaft 25 (middle portion 25B). The multiple (four) permanent magnets 27 are fixed to the rotor core 26. The rotational shaft 25 has its rear end 25A rotatably supported by a rear bearing holder 28 with a bearing 29 between them. The rear bearing holder 28 is raised from the inner surfaces of the housing halves 2L and 2R. The rotational shaft 25 has the front larger-diameter portion 25D rotatably supported by a front bearing holder 30 with a bearing 31 between them. The front bearing holder 30 is raised from the inner surfaces of the housing halves 2L and 2R behind the holder 11. The front bearing holder 30 has an upper wall 30A and a lower wall 30B. The upper wall 30A extends in the front-rear and lateral directions. The lower wall 30B extends in the front-rear and lateral directions.

A fan 32 is fixed to the rotational shaft 25 (rear larger-diameter portion 25C) between the stator 15 and the bearing 31. The fan 32 is surrounded by a box partition rib 33. The partition rib 33 has a front wall 33A extending in the vertical and lateral directions, which partially serves as the front bearing holder 30. A rear wall 33B in the partition rib 33 extending in the vertical and lateral directions has its upper and lower portions connected to the front ends of the support ribs 17. The partition rib 33 has, in its lower portion, a first lower front wall 33C and a second lower front wall 33D. The first lower front wall 33C and the second lower front wall 33D extend in the front-rear and lateral directions. The first lower front wall 33C has its rear end located rearward from the front wall 33A. The first lower front wall 33C has its front end connected to the lower inner surface of the body housing 2. The second lower front wall 33D extends between the front wall 33A and the rear wall 33B in the front-rear direction, and is located below the first lower front wall 33C.

The partition rib 33 is raised from the inner surfaces of the housing halves 2L and 2R. This structure defines, in the partition rib 33 below the fan 32, an outlet channel 35 connecting to the fan 32. The body housing 2 has multiple outlets 36 in its lower surface that serves as a downstream end of the outlet channel 35.

The holder 11 has its upper rear piece 11D1 in a normal state located above the upper wall 30A of the front bearing holder 30 and spaced from the upper wall 30A. The holder 11 has its lower rear piece 11D2 in a normal state located below the lower wall 30B of the front bearing holder 30 and spaced from the lower wall 30B.

This structure can reduce transmission of vibration from the holder 11 to the front bearing holder 30. When the holder 11 receives an external force and rotates relative to the body housing 2, the upper rear piece 11D1 hits the upper wall 30A of the front bearing holder 30, and the lower rear piece 11D2 hits the lower wall 30B of the front bearing holder 30. This restricts the rotation of the holder 11.

At least either the upper rear piece 11D1 or the lower rear piece 11D2 in the holder 11 may be eliminated.

The cylinder 11A in the holder 11 holds multiple (two) bearings 41 with a cylindrical bearing retainer 37 between them. The bearing retainer 37 is formed from a metal, or more specifically, iron. When directly held by the holder 11 formed from aluminum, the bearings 41 may creep (slip) relative to the holder 11 due to heat generated during driving. In the concrete vibrator 1 according to the present embodiment, the bearings 41 are held by the holder 11 with the bearing retainer 37 between them. This structure allows each bearing 41 to be less likely to creep. A spacer 38 is located between the front and rear bearings 41. The front and rear bearings 41 and the spacer 38 are fixed to the bearing retainer 37 with a snap ring 39.

The front and rear bearings 41 support a spindle 40 rotatably about its central axis. The spindle 40 has a front end 40A, a larger-diameter portion 40B, and a rear end 40C. The spindle 40 is located in front of and coaxially with the rotational shaft 25. The spindle 40 is connected to the rotational shaft 25 with a coupling 42. The spindle 40 has its front end 40A protruding frontward from the cylinder 11A. The spindle 40 has its larger-diameter portion 40B located radially inward from the spacer 38 between the front and rear bearings 41.

Figure 8A:
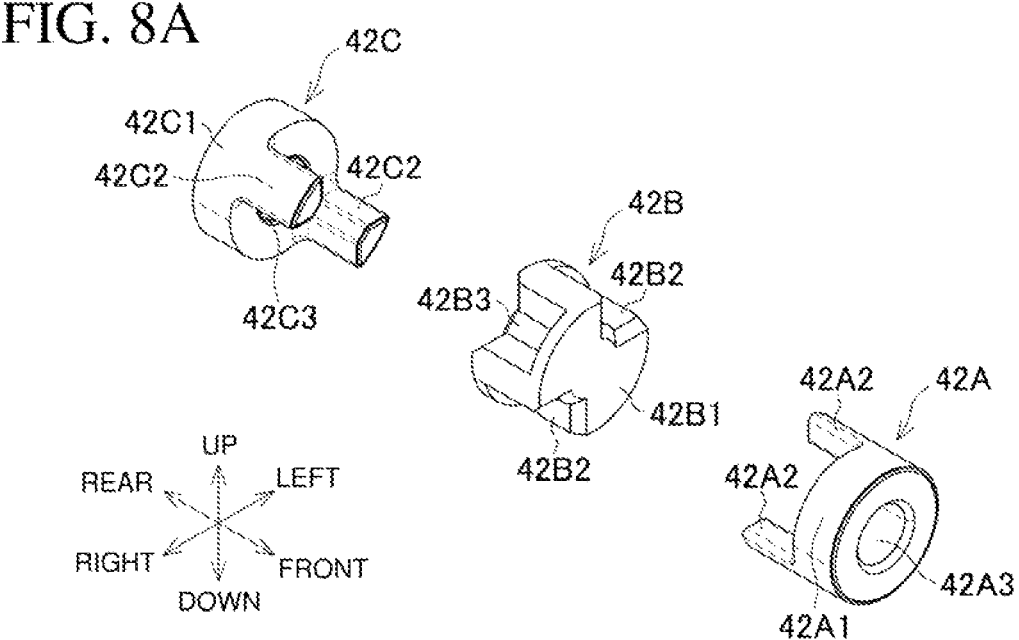
FIG. 8A is an exploded perspective view of a coupling in the rechargeable concrete vibrator viewed from the front.
Figure 8B:
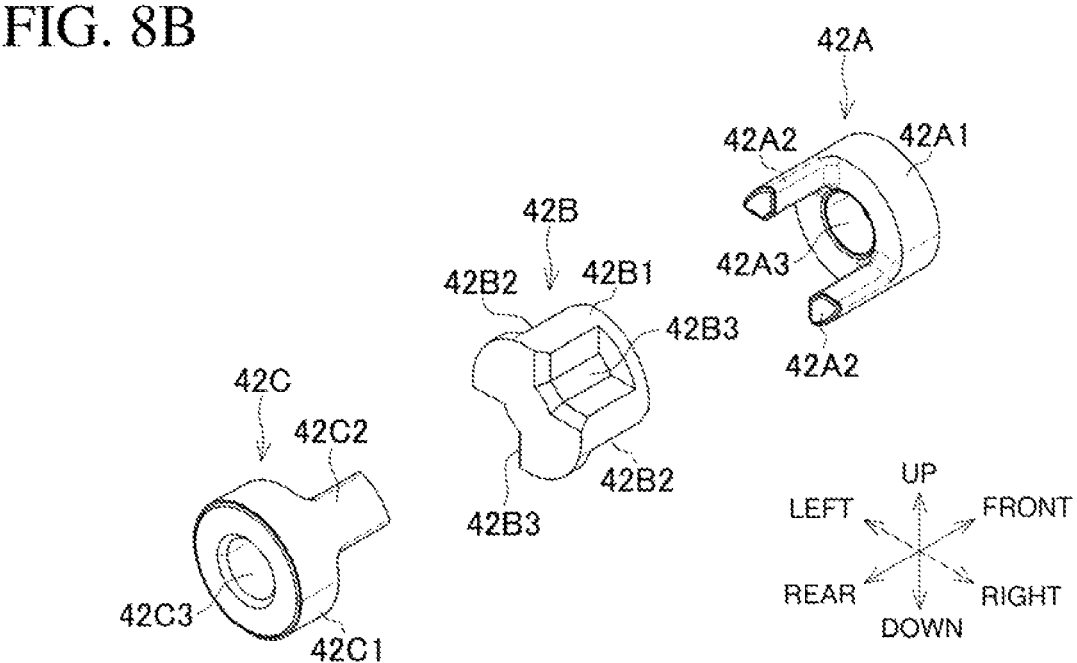
FIG. 8B is an exploded perspective view of the coupling viewed from the rear.

FIG. 8A is an exploded perspective view of the coupling 42 viewed from the front. FIG. 8B is an exploded perspective view of the coupling 42 viewed from the rear.

The coupling 42 includes an iron front hub 42A, an elastic (rubber) element 42B, and an iron rear hub 42C.

The front hub 42A includes a cylindrical front hub body 42A1 and a pair of front hub tabs 42A2. Each front hub tab 42A2 protrudes rearward from the rear of the front hub body 42A1. The front hub body 42A1 has a front hole 42A3. The front hole 42A3 receives the spindle 40 (rear end 40C).

The element 42B includes a columnar element body 42B1, a pair of front grooves 42B2, and a pair of rear grooves 42B3. Each front groove 42B2 extends from the front end to the rear end edge of the element body 42B1 and is recessed radially inward from its adjacent portion. Each rear groove 42B3 extends from the rear end to the front end edge of the element body 42B1 and is recessed radially inward from its adjacent portion. The front grooves 42B2 and the rear grooves 42B3 are alternately arranged with one another in the circumferential direction. The front grooves 42B2 and the rear grooves 42B3 are arranged circumferentially entirely on the element body 42B1.

The rear hub 42C includes a cylindrical rear hub body 42C1 and a pair of rear hub tabs 42C2. Each rear hub tab 42C2 protrudes frontward from the front of the rear hub body 42C1. The rear hub body 42C1 has a rear hole 42C3. The rear hole 42C3 receives the rotational shaft 25 (front end 25E).

Each front hub tab 42A2 is received in the corresponding front groove 42B2. The front hub 42A is connected to the element 42B.

Each rear hub tab 42C2 is received in the corresponding rear groove 42B3. The rear hub 42C is connected to the element 42B.

This structure facilitates attachment of the coupling 42.

At least the front hub tabs or the rear hub tabs may be included in the element 42B. The grooves may be included at least in the front hub 42A or in the rear hub 42C.

The spindle 40 may be located between the coupling 42 and a flexible shaft 47. This structure facilitates attachment of the coupling 42 and the flexible shaft 47.

The vibrator 14 is attached to the cylinder 11A with a cylindrical hose holder 45 at the rear end of the vibrator 14 screwed onto the cylinder 11A. The vibrator 14 includes an outer flexible hose 46 and the flexible shaft 47. The flexible shaft 47 is located in an internal space of the flexible hose 46. This structure facilitates attachment of the elastic member 12 and the flexible hose 46.

The flexible hose 46 as a hose has axial rigidity of a degree higher than a predetermined degree, and flexibility, which is the ability to bend. The flexible shaft 47 as a shaft has axial rigidity of a value higher than a predetermined value, and flexibility, which is the ability to bend. At least either the hose or the shaft may not be flexible.

The flexible shaft 47 receives an unbalanced weight 44 as an imbalance member connected to its front end. The columnar unbalanced weight 44 extends in the front-rear direction. The unbalanced weight 44 is supported rotatably about an imaginary rotational axis in the front-rear direction. The unbalanced weight 44 has two recesses 44A. The recesses 44A are portions recessed from a curved surface of an imaginary column with the rotational shaft of the unbalanced weight 44 centered. The unbalanced weight 44 with the recesses 44A is rotationally asymmetric with respect to the rotational shaft. This unbalances the unbalanced weight 44. The unbalanced weight 44 is unbalanced in weight by the recesses 44A. One recess 44A or three or more recesses 44A may be used. The unbalanced weight 44 may be shaped differently. Multiple unbalanced weights 44 may be used.

The flexible hose 46 receives a cap 49 covering its front end.

The flexible shaft 47 has its rear end connected coaxially to the front end of the spindle 40 with a joint sleeve 48 between them.

The controller compartment 5 accommodates the controller 50 extending rearward. The controller 50 includes a case 51 and the control circuit board 52. The control circuit board 52 is accommodated in the case 51. The case 51 has its open portion facing upward and is formed from aluminum or another highly heat-dissipating metal. The control circuit board 52 includes, for example, a microcomputer and multiple switching elements on its upper surface. In FIG. 2, the right side surface, not the longitudinal central cross section, of the controller 50 is shown.

The case 51 is held by holding ribs 53. The holding ribs 53 are raised from the inner surfaces of the housing halves 2L and 2R. The case 51 includes, at the center of its lower surface, a heat dissipator 54 having multiple protrusions and recesses. The holding rib 53 holds the periphery of the case 51 excluding the heat dissipator 54.

The controller 50 may be accommodated in another space rather than in the controller compartment 5 in the concrete vibrator 1.

In front of the controller 50, the body housing 2 has multiple inlets 55A and 55B in its lower wall. Each inlet 55A is located behind the rear wall 33B of the partition rib 33. The inlets 55B are located behind the inlets 55A and in front of the controller 50.

Behind the inlets 55B, the housing halves 2L and 2R have lower guide walls 56 raised from their inner surfaces. Each lower guide wall 56 extends upward from a boss for the screw 3 in the battery holder 7. The lower guide wall 56 has its upper end tilting frontward from its lower portion. The lower guide wall 56 has its upper end behind the inlets 55A. The lower guide wall 56 has its upper end above the controller 50.

Above the lower guide wall 56, the housing halves 2L and 2R have upper guide walls 57 raised from their inner surfaces. Each upper guide wall 57 extends rearward from the rear wall 33B of the partition rib 33. The upper guide wall 57 has its rear portion along the lower surface of the body housing 2. The upper guide wall 57 has its front end above the lower guide wall 56 and oriented in the same direction as the upper end of the lower guide wall 56. The inlets 55A are located below the lower guide wall 56.

The lower guide walls 56 and the upper guide walls 57 define a Y-shaped inlet channel 58 above the inlets 55A and behind the inlets 55B. More specifically, air drawn through the inlets 55A moves rearward along the upper guide wall 57, and reaches a space above the lower guide wall 56. Air drawn through the inlets 55B moves upward along the lower guide wall 56, and reaches the space above the lower guide wall 56. Air merged together above the lower guide wall 56 moves rearward between the distal end of the upper guide wall 57 and the upper end of the lower guide wall 56. The air is divided into two air flows, one of which moves through the controller 50 and then reaches the motor 10, and the other of which directly reaches the motor 10.

Above the controller 50 and behind the motor 10, the controller compartment 5 includes a display panel 59 on its upper surface. The display panel 59 is electrically connected to the control circuit board 52 to indicate the battery power level of a battery pack 90.

The grip 6 includes an upper grip 60 and a lower grip 61.

The upper grip 60 extends in the front-rear direction. The upper grip 60 has its front end connected to the motor compartment 4 from above.

The lower grip 61 extends vertically. The lower grip 61 has its upper end connected to the rear end of the upper grip 60. The lower grip 61 has its lower end connected to the battery holder 7 from above.

The grip 6 is connected to the motor compartment 4, the controller compartment 5, and the battery holder 7 in a loop.

The upper grip 60 has shoulder belt engagement portions 62 on its front and rear upper surfaces. When a user operates the concrete vibrator 1 with a shoulder belt over his or her shoulder, the engagement portions 62 aligned in the front-rear direction allow him or her to easily adjust the orientation of the vibrator 14.

The lower grip 61 includes a switch 65 in its upper portion. The switch 65 includes a plunger 66 protruding frontward. A switch lever 67 is located in front of the plunger 66. In response to the switch lever 67 being pressed rearward by the user, the switch lever 67 presses the plunger 66. The switch 65 is electrically connected to the control circuit board 52 with lead wires 68. A cylindrical ferrite core 69 surrounds the lead wires 68.

The upper grip 60 includes a lock button 71 above the switch 65. The lock button 71 in a normal state prevents the switch lever 67 from being pressed. The lock button 71 being pressed laterally inward allows the switch lever 67 to be pressed.

In FIG. 2, the right side surfaces, not the longitudinal central cross sections, of the switch 65, the plunger 66, the switch lever 67, and the lock button 71 are shown.

The battery holder 7 holds a terminal mount 83. The terminal mount 83 being held extends in the front-rear direction. The terminal mount 83 includes multiple terminal plates (not shown). The terminal mount 83 is electrically connected to the control circuit board 52. In FIG. 2, the right side surface, not the longitudinal central cross section, of the terminal mount 83 is shown.

The battery holder 7 has a battery recess 86 recessed upward. The battery recess 86 is located behind the terminal mount 83.

The battery holder 7 can receive the battery pack 90 by pushing the battery pack 90 forward into the battery holder 7 from the rear. In FIG. 2, the right side surface, not the longitudinal central cross section, of the battery pack 90 is shown.

A connection member 92 is located in an upper portion of the battery pack 90. The connection member 92 is connectable to the battery holder 7. The connection member 92 includes multiple slits (not shown) and metal terminals inside the slits. When the battery pack 90 is attached to the battery holder 7, the metal terminals in the connection member 92 come in contact with the terminal plates in the terminal mount 83. This electrically connects the battery pack 90 to the terminal mount 83.

The connection member 92 includes a hook button 95 in its rear portion. The hook button 95 includes a hook 96 facing upward on its front end. In the hook button 95, the hook 96 is urged upward by a coil spring (not shown) to protrude upward from the connection member 92. When the battery holder 7 receives the battery pack 90, the hook button 95 is received in the battery recess 86.

To detach the battery pack 90, the hook button 95 is pressed downward. The hook 96 is then disengaged from the battery recess 86, and the battery pack 90 can be slid rearward to be detached.

The battery cover 8 is a box and can accommodate the battery pack 90. The battery cover 8 covering the battery pack 90 is attachable to the battery holder 7.

The battery cover 8 includes a front body cover 100 and a rear openable cover 101. The openable cover 101 is operable to open or close the rear of the body cover 100. With the openable cover 101 opened, the battery pack 90 can be attachable and detachable without the battery cover 8 being detached from the battery holder 7.

Examples of operation of such a concrete vibrator 1 will now be described.

For casting concrete, the user attaches the vibrator 14 to the concrete vibrator 1, and inserts it into concrete in a cast. In this state, the user presses the switch lever 67. The switch 65 is then turned on to supply power from the battery pack 90 to the motor 10 through the controller 50. This rotates the rotor 16. In other words, the microcomputer in the control circuit board 52 determines the rotational position of the rotor 16 based on a detection signal transmitted from the sensor circuit board 23, and causes the switching elements to perform the switching operation. This applies a three-phase current sequentially to each coil 20, and rotates the rotor 16.

The rotational shaft 25 is thus rotated to rotate the spindle 40 with the coupling 42. This rotates the flexible shaft 47 in the vibrator 14. This rotates the unbalanced weight 44 to generate vibration in the vibrator 14. The vibrating vibrator 14 then causes concrete to flow around in the entire cast.

When the spindle 40 is misaligned from the rotational shaft 25 (body housing 2), the coupling 42 continues to transmit the rotation of the rotational shaft 25 to the spindle 40. The elastic member 12 is located between the body housing 2 and the vibrator 14 (flexible hose 46), and the vibrator 14 (flexible hose 46) is movable relative to the body housing 2. This structure can transmit the rotational force more reliably to the vibrator 14.

More specifically, such misalignments of the spindle 40 include an angular misalignment (misalignment caused by tilting), an imbalance (vertical misalignment), and an endplay (misalignment in the front-rear direction) between the imaginary center axis line of the rotational shaft 25 in the front-rear direction and the imaginary center axis line of the spindle 40 in the front-rear direction. At least two of the angular misalignment, the imbalance, and the endplay may appear together.

With at least either the front hub 42A or the rear hub 42C tilting relative to the element 42B, the angular misalignment is permissible. One of the front grooves 42B2 on the element 42B receives one of the front hub tabs 42A2 more deeply, and the other front groove 42B2 receives the other front hub tab 42A2 more shallowly. In this state, the front hub 42A tilts relative to the element 42B while being connected to the element 42B. One of the rear grooves 42B3 receives one of the rear hub tabs 42C2 more deeply, and the other rear groove 42B3 receives the other rear hub tab 42C2 more shallowly. In this state, the rear hub 42C tilts relative to the element 42B while being connected to the element 42B.

With the front hub 42A and the rear hub 42C facing in the same direction while tilting relative to and being connected to the element 42B, the imbalance is permissible.

With at least either the front hub 42A or the rear hub 42C moving in the front-rear direction relative to the rubber element 42B, the endplay is permissible. The front hub 42A can move forward or backward, while being connected to the element 42B, in accordance with the depth to which the front grooves 42B2 receive both front hub tabs 42A2. The rear hub 42C can move forward or backward, while being connected to the element 42B, in accordance with the depth to which the rear grooves 42B3 receive both rear hub tabs 42C2.

The vibration of the vibrator 14 is less likely to be transmitted to the area including the motor 10.

In other words, the vibration transmitted from the vibrator 14 (mainly from the flexible hose 46) to the holder 11 is attenuated by the elastic member 12, and thus is less likely to be transmitted to the body housing 2.

The elastic member 12 has the protrusions 12E, the front ridges 12F, and the rear ridges 12G. The protrusions 12E, the front ridges 12F, and the rear ridges 12G define spaces with the holder 11 adjacent to them. A deformed portion of the elastic member 12 generated during attenuation of the vibration can be located within the spaces. In other words, the elastic member 12 is sufficiently deformable. The elastic member 12 thus reduces the vibration further.

The coupling 42 reduces vibration transmitted from the vibrator 14 (mainly from the flexible shaft 47) to the spindle 40.

As the fan 32 rotates together with the rotational shaft 25, air is drawn through the inlets 55A and 55B in the controller compartment 5 as indicated by dotted arrows in FIG. 2.

The air partially flows along the Y-shaped inlet channel 58 toward the controller 50. The air is in contact with the heat dissipator 54 in the case 51 to facilitate heat dissipation from the controller 50. The air passing through the controller 50 and the air not passing through the controller 50 together pass through the motor 10 between the support ribs 17 to cool the motor 10.

After cooling the motor 10, the air flows radially outward from the fan 32, passes through the outlet channel 35, and is then discharged outward through the outlets 36.

The battery holder 7 receives the battery cover 8 in a detachable manner. When the battery cover 8 is damaged, the damaged battery cover 8 can thus be detached for repair or replacement.

The battery holder 7 can also receive a battery pack larger than the battery pack 90. The battery holder 7 thus also receives a larger battery cover designed for a larger battery pack in a detachable manner, in place of the battery cover 8.

The embodiments and the modifications are not limited to those described above. For example, the embodiments and the modifications may be further modified appropriately as described below.

In some embodiments, the elastic member may be a block or in another shape.

In some embodiments, a cylinder may be located between the hose holder 45 and the holder 11.

In some embodiments, the spindle 40 may be divided into multiple parts, which are aligned in the front-rear direction and connected to one another. The spindle 40 may be eliminated.

In some embodiments, the coupling 42 may be a coupling different from that described above. The coupling 42 may have, for example, a single element 42B and a single hub. The coupling 42 may have, for example, multiple elements 42B and multiple hubs. The coupling 42 may include components other than hub tabs and grooves for engagement.

In some embodiments, another structure may be used, rather than the structure in which the battery holder 7 receives the battery pack 90 in a manner slidable from the rear. The battery pack 90 may be received in the battery holder 7 in a manner slidable from the front, or right or left. The battery pack 90 may be received in a manner placeable from the bottom.

In some embodiments, the battery holder 7 may be located differently, rather than being located in the lower portion of the body housing 2. The battery holder 7 may be located in a rear portion, an upper portion, or one of side portions of the body housing 2.

The battery pack 90 and the battery cover 8 may have other sizes rather than the two sizes. Three or more battery packs and battery covers with different sizes may be used selectively.

At least any function, any position, any type, any number, or any material of the components or parts may be modified appropriately. For example, the elastic member may be formed from another material rather than rubber. In some embodiments, the concrete vibrator 1 may be powered by utility power (alternating current, or AC) in place of the battery pack 90 (direct current, or DC), or together with the battery pack 90.

The present disclosure is applicable not only to a concrete vibrator but also to other electric work machines, such as a mixer for mixing paints or other materials.

REFERENCE SIGNS LIST

1 concrete vibrator
2 body housing (housing)
2LB, 2LD1, 2LD2 recess
10 motor
11 holder
12 elastic member (elastic member)
12E protrusion
12F front ridge (protrusion)
12G rear ridge (protrusion)
14 vibrator
25 rotational shaft
40 spindle
42 coupling
42A front hub
42A2 front hub tab
42B element
42B2 front groove
42B3 rear groove
42C rear hub
42C2 rear hub tab
44 unbalanced weight (imbalance member)
45 hose holder
46 flexible hose (hose)
47 flexible shaft (shaft)

What is claimed is:

1. A concrete vibrator, comprising:
   a motor;
   a shaft drivable by the motor;
   an imbalance member drivable with the shaft;
   a hose at least partially covering the imbalance member and the shaft;
   a housing accommodating the motor; and
   a holder attached to a front end of the housing;
   an elastic member between the housing and an outer surface of the holder.

2. The concrete vibrator according to claim 1, wherein the elastic member has a ring shape.

3. The concrete vibrator according to claim 1, wherein the elastic member has a half ring shape.

4. The concrete vibrator according to claim 1, wherein the hose includes a hose holder,
   the holder is connected to the hose with the hose holder, and
   the elastic member is in contact with the housing.

5. The concrete vibrator according to claim 1, wherein the elastic member is in contact with the holder on an outer surface of the elastic member, and the outer surface excludes a radially outward outer side surface of the elastic member.

6. The concrete vibrator according to claim 5, wherein the elastic member includes a protrusion on the outer surface in contact with the holder.

7. The concrete vibrator according to claim 1, wherein the elastic member is in contact with the housing, and the housing has one or more recesses on a surface of the housing in contact with the elastic member.

8. A concrete vibrator, comprising:
   a motor including a rotational motor shaft;
   a housing accommodating the motor;
   a spindle connected to the motor shaft;
   a flexible shaft drivable with the spindle;
   an imbalance member drivable with the flexible shaft;
   a hose at least partially covering the imbalance member and the flexible shaft, the hose being movable relative to the housing;
   a coupling between the rotational motor shaft and the spindle, the coupling including,
   a front hub connected the spindle,
   a rear hub connected to the rotational motor shaft, and
   an elastic element between the front hub and the rear hub.

9. The concrete vibrator according to claim 8, wherein the front hub and the rear hub include hub tabs, and the elastic element has grooves receiving the hub tabs.

10. The concrete vibrator according to claim 4, wherein the elastic member is in contact with the holder on an outer surface of the elastic member, and the outer surface excludes a radially outward outer side surface of the elastic member.

11. The concrete vibrator according to claim 2, wherein the elastic member is in contact with the housing, and the housing has one or more recesses on a surface of the housing in contact with the elastic member.

12. The concrete vibrator according to claim 3, wherein the elastic member is in contact with the housing, and the housing has one or more recesses on a surface of the housing in contact with the elastic member.

13. The concrete vibrator according to claim 1, wherein the holder includes
a front flange protruding radially outward, and
a rear flange protruding radially outward, the rear flange disposed rearward from the front flange, and
the elastic member is disposed between the front flange and the rear flange.

14. The concrete vibrator according to claim 1, further comprising:
a spindle connected to the shaft; and
a bearing holding the spindle,
wherein the holder holds the bearing.

15. The concrete vibrator according to claim 1, wherein the holder being coaxial with the hose.

* * * * *